United States Patent [19]

O'Sullivan

[11] Patent Number: 5,140,512
[45] Date of Patent: Aug. 18, 1992

[54] ZERO VOLTAGE SWITCHING DC/DC CONVERTER

[76] Inventor: Dermot O'Sullivan, Spiegeldreef 19, Leiderdorp, Netherlands

[21] Appl. No.: 657,072

[22] Filed: Feb. 19, 1991

[30] Foreign Application Priority Data

Feb. 20, 1990 [FR] France ............... 90 02014

[51] Int. Cl.$^5$ ............................................. H02M 3/337
[52] U.S. Cl. ........................................ 363/24; 363/133
[58] Field of Search ........................... 363/22-25, 363/55, 56, 58, 97, 98, 132, 133; 323/271, 285

[56] References Cited

U.S. PATENT DOCUMENTS

| | | | |
|---|---|---|---|
| 4,443,840 | 9/1982 | Geissler et al. | 363/24 |
| 4,484,256 | 4/1982 | Hartman | 363/26 |
| 4,931,716 | 6/1990 | Jovanovic et al. | 323/285 |
| 4,959,765 | 9/1990 | Weinberg | 363/24 X |

FOREIGN PATENT DOCUMENTS 2335051 12/1976 France .
WO89/04082 5/1989 PCT Int'l Appl. .

Primary Examiner—Steven L. Stephan
Assistant Examiner—Emanuel Todd Voeltz

[57] ABSTRACT

A zero voltage switching DC/DC converter comprises a transformer with two opposed primary windings between which is a center tap and at least one secondary winding connected to a load by a rectifier and capacitor filter circuit. A first terminal of a constant voltage supply is connected to the center tap of the transformer. Two switching units are each connected in series between the second terminal of the voltage supply and a respective primary winding. The switches connect the second terminal of the voltage supply alternately and periodically to one or the other of the primary windings. A control device imposes between opening of one switch and subsequent closing of the other switch a switching time during which both switches are open. A device for automatically adjusting the switching time includes a detector adapted to compare the voltage of each primary winding with a reference voltage and an inhibiting device adapted to prevent, after opening of one switch, closing of the other switch until the voltage of the primary winding which corresponds to the latter switch falls below a predetermined threshold.

7 Claims, 3 Drawing Sheets

ZERO VOLTAGE SWITCHING DC/DC CONVERTER

BACKGROUND OF THE INVENTION

1. Field of the Invention

The present invention concerns a zero voltage switching DC/DC converter.

2. Description of the Prior Art

Zero voltage switching DC/DC converters are essentially based on a transformer with two opposed primary windings selectively connected to a constant voltage supply through a switching unit. Switching is controlled in such a way as to connect the windings alternately so as to produce during each half-cycle a correlative reversing of the magnetic flux in the transformer, producing across a secondary winding of the latter an alternating current voltage which is subsequently rectified and filtered as necessary.

One of the problems encountered in designing and developing a converter of this kind relates to the unwanted contribution of stray parameters of the transformer (mainly its magnetization inductance and the stray capacitance between the turns of its windings) and the switching units.

If a transformer has a relatively high stray capacitance, reversing the voltage across the stray capacitance requires currents with high peak values, leading to significant switching losses in the converter. Furthermore, the sudden increase to a high current value will generate high-frequency interference. These drawbacks increase with the frequency and the transformer ratio.

The technique known as "zero voltage switching" is used to alleviate this drawback and entails controlling the converter in such a way that the voltage across the switch is zero or virtually zero on changing from the open (non-conducting) to the closed (conducting) state of the switch. The voltage is reversed by opening the switch which was conducting and enabling the magnetization current to charge the stray capacitance in such a way as to reverse the winding current and produce a virtually null voltage across the non-conducting switch. The current passing through the switch will therefore be initially null and will then progressively increase, enabling "soft" switching of the winding, with increased efficiency and minimum interference.

The document U.S. Pat. No. 4,443,840 describes a converter of this type in which, to ensure that switching occurs at zero voltage, a predetermined fixed time-delay is imposed between the opening of one switch and the closing of the opposite switch.

During this time interval both switches are open and the energy stored in the stray magnetization inductance of the transformer is discharged into the (stray) capacitance between turns of the transformer windings, spontaneous oscillation in the resulting LC circuit reversing the polarity of the voltage across the primary windings. Once this reversal of polarity has been obtained, and after the predetermined time-lapse mentioned above has expired, control logic orders the appropriate switch to be closed.

One drawback of the converter described in this document is that the time-delay mentioned above (referred to hereinafter as the "switching time") is of fixed duration, which must be calculated for each particular configuration of the converter, in particular according to the inherent resonant frequency of the transformer, which is in turn determined by the stray inductance and capacitance characteristics of the transformer and the switches. As these parameters can vary significantly from one converter to another, it is necessary to calculate or determine experimentally the value of the required switching time for each different converter configuration.

A second drawback of the converter described in this document is that, even for a given converter configuration, it is generally necessary to provide for a final adjustment of the switching time for each individual converter built, because of significant spread in the specifications of the components used: the characteristics determining the spontaneous oscillation frequency and therefore the predetermined switching time are, as already mentioned, stray parameters of the transformer which are difficult to control in manufacture. The aforementioned document underlines this difficulty and to remedy it provides means for fine adjustment of the switching time.

Finally, a third drawback of the converter described in this document is that it requires particularly complex control logic to sequence the various switching actions.

One object of the invention is to propose a zero voltage switching DC/DC converter which overcomes all of these drawbacks by enabling automatic adaptation of the switching time and which therefore:

requires no specific adaptation according to the chosen converter configuration, for any given configuration, automatically compensates for spread in the specifications of the components used, even if such spread is wide, can automatically compensate for variations in load conditions and environmental factors (especially the operating temperature), and requires only very simple control logic.

To this end, the invention essentially proposes that after one of the switches is opened the closing of the opposite switch is automatically inhibited until spontaneous oscillation in the transformer has reduced to a null or quasi-null value the voltage across the switch, this condition being detected by appropriate detection means.

Because of this, and so differing from the prior art technique, the switching time will not follow a fixed predetermined duration, but a variable duration controlled automatically according to the voltage detected across the switch which is to be closed.

This technique avoids the prior art need to determine and adjust the switching time between the operation of the switches and so circumvents all the disadvantages resulting from this obligation.

SUMMARY OF THE INVENTION

The present invention consists in a zero voltage switching DC/DC converter comprising a transformer with two opposed primary windings between which is a center tap and at least one secondary winding connected to a load by rectifier and capacitor filter means, a constant voltage supply of which a first terminal is connected to the center tap of the transformer, two switching means each connected in series between the second terminal of the voltage supply and a respective primary winding and means for controlling said switches so as to connect the second terminal of the voltage supply alternately and periodically to one or the other of the primary windings, said control means imposing between opening of one switch and subsequent closing of the other switch a switching time during which both switches are open, said converter further comprising means for automatically adjusting the switching time including detector means adapted to compare the voltage of each primary winding with a reference voltage and inhibiting means adapted to prevent, after opening of one switch, closing of the other switch until the voltage of the primary winding which corresponds to the latter switch falls below a predetermined threshold.

Advantageously, said inhibiting means comprise, for each switch, logic gate means of which one input receives from said control means a signal to close the switch, the other input receives from the detector means a signal indicating that the voltage of the respective primary windings is not below said predetermined threshold and the output of which commands closing of the respective switch.

In a first embodiment, said switch closing signal is a control logic signal derived from an external clock signal.

In a second embodiment, said switch closing signal is a feedback signal derived from the voltage provided by an auxiliary winding of a saturating transformer.

Advantageously, in either case, said detector means comprise for each switch a diode connected between the distal end of the respective primary winding and one terminal of a divider bridge whose other terminal is connected to a reference voltage supply, said inhibiting means being controlled by a signal at the center point of said divider bridge.

The converter may further comprise capacitors for inhibiting voltage reversals which could arise from the presence of high-frequency noise connected between the terminals of each respective switch. It is then advantageous for the converter to further comprise a start-up circuit including a gate responsive to detection of simultaneous opening of both switches by causing said inhibiting capacitors to be discharged.

Other characteristics and advantages of the invention will emerge more clearly from the following description with reference to the appended drawings.

DETAILED DESCRIPTION OF THE INVENTION

Figure 1:
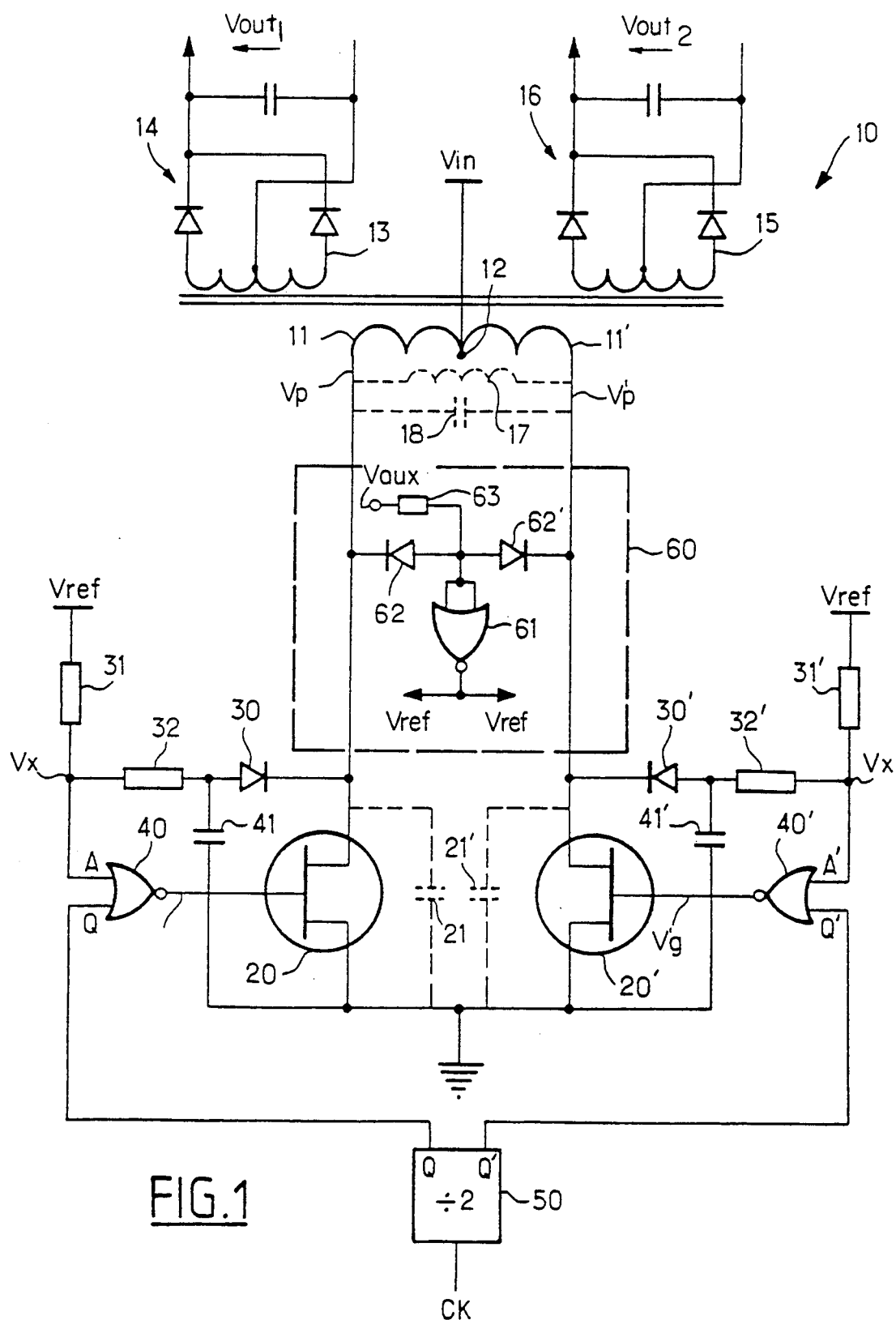
FIG. 1 shows a first embodiment of the invention.

FIG. 1 shows a first embodiment of the invention in the form of an external control converter, by which is meant a converter in which the repetition frequency is determined by a clock signal applied externally.

The converter essentially comprises a transformer 10 with two opposed primary windings 11, 11' having a center tap 12 and one or more secondary windings across which an alternating current voltage is produced. In this particular example the transformer has two secondary windings 13, 15 feeding respective rectifier and filter means 14, 16 to produce a respective output voltage Vout1, Vout2.

The primary windings 11, 11' each cooperate with a respective switching unit 20, 20' which may be of any known type, for example an MOSFET power transistor as shown in the figure. Note, however, that the teaching of the invention is totally independent of the chosen component technology.

The stray magnetization inductance 17 of the transformer and the stray interwinding capacitance 18 of the transformer are shown in dashed outline, as is the stray capacitance 21, 21' between the drain and source of the switches 20, 20' when the latter are open.

The center tap 12 is connected to a direct current supply at a voltage Vin, the other terminal (distal terminal) of each primary winding 11, 11' being selectively grounded through the respective switch 20, 20' (note that the reverse configuration could equally well be used, with the center tap grounded and the distal terminals of the primary windings selectively connected to the voltage supply Vin through the switches 20, 20').

This configuration is conventional in itself and the two switches 20, 20' are controlled by application to their gates of respective control signals, Vg, Vg' to cause them to operate in push-pull mode (which means that to close one switch the other must necessarily be open).

This push-pull control is a specific feature of the invention as will now be described.

Each half of the push-pull circuit comprises a respective diode 30, 30' the cathode of which is connected to the distal terminal of the corresponding winding 11, 11' and the anode of which is connected to a reference voltage Vref by a series-connected pair of resistors 31, 32 and 31', 32'. The point common to the two resistors is connected to one input of a respective NOR gate 40, 40' to which it applies a signal A, A'. The other input receives one of two complementary signals Q, Q' produced by a frequency divider 50 receiving the external clock signal CK.

A start-up circuit 60 is advantageously provided to control the reference voltage Vref. It comprises an NOR gate 61 used as an inverter, two diodes 62 and 62' and a pull-up resistor 63 which forces the voltage towards the logic supply voltage Vaux.

Figure 2:
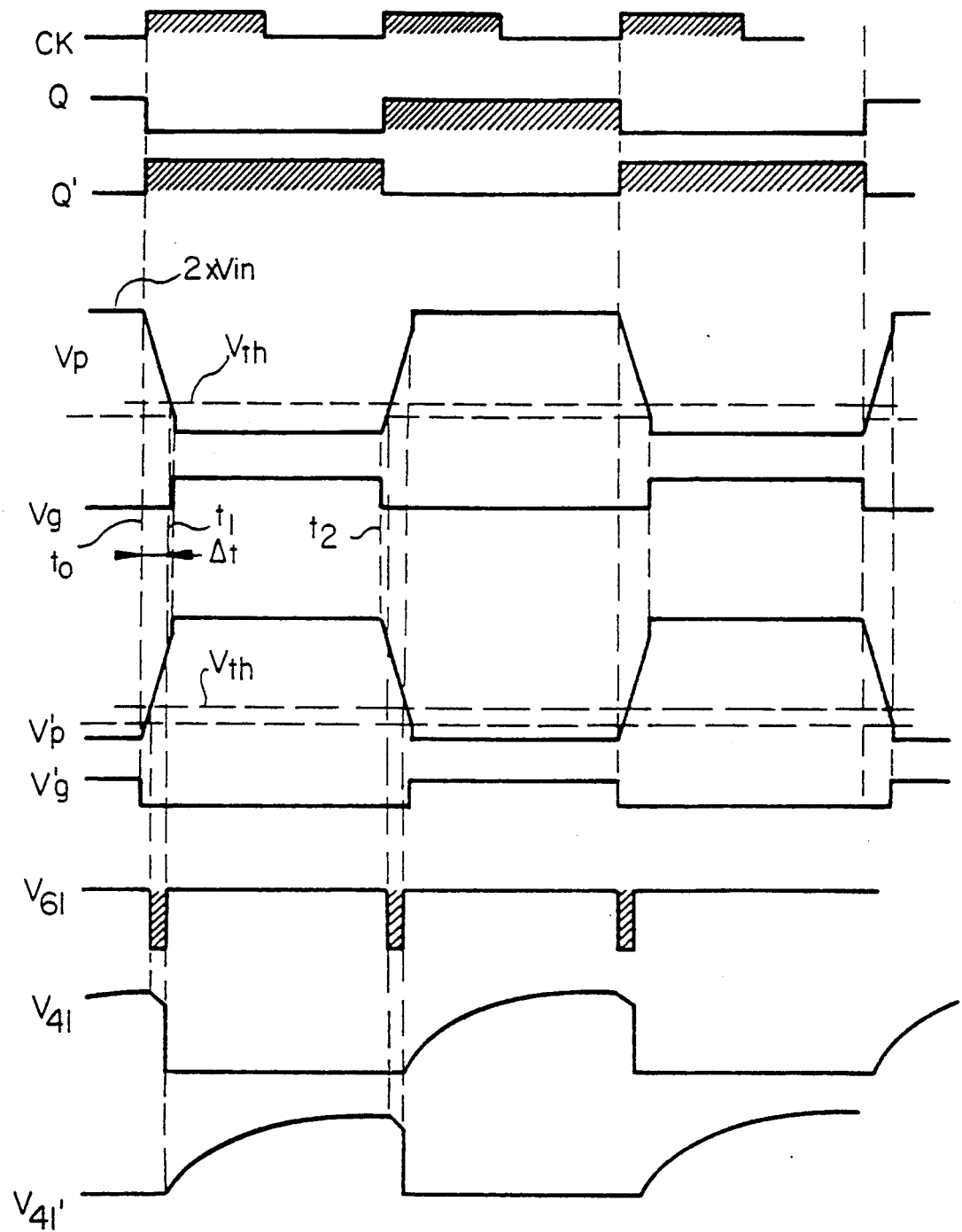
FIG. 2 is a timing diagram for various signals produced by the FIG. 1 circuit.

The operation of this circuit will now be described with reference to the timing diagrams in FIG. 2, which respectively show:

the clock signal CK, the two logic signals Q' and Q obtained at the output of the divider 50 (Q' being the logical complement of Q), the voltage Vp at the distal end of the winding 11 (this is also the voltage between the drain and source of the switch 20), the logic signal Vg constituting the control voltage applied to the gate of the switch 20, the high logic state ("1") corresponding to the closed (conducting) state and the low logic state ("0") corresponding to the open (non-conducting) state of the switch, the voltage Vp' at the distal end of the winding 11' (this is also the voltage between the drain and source of the switch 20'), the logic signal Vg' constituting the control voltage applied to the gate of the switch 20'.

Not shown is the predetermined threshold voltage Vx below which, after opening one switch, closing of the other switch is prevented as long as the voltage across the primary winding corresponding to it has not dropped below the predetermined threshold; the value of Vx depends on the logic threshold voltage Vth of the NOR gates, the reference voltage Vref, the voltage Vd of the diode 30 and the values R32 and R31 of the resistors 31 and 32, the value of Vx being given by the equation:

$$Vx = Vth.(R32/R31+1) - Vref.(R32/R31) - Vd.$$

Initially the start-up circuit 60 can be ignored (together with the signals V61, V41 and V41' of the FIG. 2 timing diagram) by assuming that the output of the gate 61 is in the high logic state ("1").

Initially, that is to say just before a time t0, the switch 20' is closed and the switch 20 is open (so that Vg="0" and Vg'="1"). At this time the voltage Vp is approximately twice the DC input voltage Vin, so that the diode 30 is reverse biased, so isolating the resistors 31 and 32 from the voltage Vp. The voltage at the center point of these two resistors, representing the signal A applied to the gate 40, is then equal to the voltage Vx which is chosen so that it approximates the logic "1" level so that A="1" at the corresponding input of the gate 40. As this is an NOR gate (which delivers a logic "1" at its output if and only if both its inputs are at logic "0"), its output is at logic "0" so that Vg="0", which locks the switch 20 in the open state.

Still at t<t0, Q="1" and Q'="0". As the switch 20' is conducting, the cathode of the diode 30' is at ground potentional (ignoring the voltage drop between the drain and the source of the switch 20'), so that this diode is forward biased, placing the common point of the resistors 31' and 32' at a voltage less than Vx and therefore less than the logic "1" level (the values of the resistors are chosen to achieve this result).

As a result A'="0" and, because Q'="0" also, the gate 40' produces at its output a logic "1" (Vg'="1"), so locking the switch 20' in the closed state.

At time t0 a rising edge of the clock signal CK reverses the logic values of the signals Q and Q' so that Q="0" and Q'="1".

As soon as Q' goes to "1" the gate 40' changes state so that Vg'="0" and so that the switch 20' is immediately opened. The gate 40 receives on one input the signal Q="0" but as the voltage Vp is still twice Vin the diode 30 remains in the non-conducting state and the other input A remains at logic "1", so that the control signal remains at Vg="0", so keeping the switch 20 open.

Note that at this time the switches 20 and 20' are both held open.

After the switch 20 is opened the primary of the transformer is isolated from the supply voltage Vin and the energy stored in the magnetization inductance 17 produces a current charging the stray interwinding capacitance 18 and the stray capacitances of the switches 21 and 21'. The voltage Vp (Vp=2×Vin) then falls towards zero at the natural resonant frequency of the LC resonant circuit formed by the above components. Simultaneously, voltage Vp' increases from zero towards 2×Vin.

At time t1 voltage Vp falls below the voltage Vref which reverses the biasing of the diode 30 which begins to conduct. The voltage A then goes from logic "1" (voltage Vx) to logic "0". As a result A=Q="0", which changes the state of the gate 40 so that Vg="1" and the switch 20 is closed.

An appropriate choice of resistors 31, 32 determines exactly the level of the voltage Vp in relation to the threshold voltage of the chosen gate 40 from which the logic changes state.

Be this as it may, the switch 20 is caused to conduct with a very low voltage Vp across it, and so with minimal switching losses and generating very little interference.

Capacitors 41, 41' are provided as a safety measure to be sure that, as the voltage across the switch falls towards a null voltage, the same applies to the voltage across the capacitors 41, 41'. Any high-frequency resonance which could affect the resulting logic state of the NOR gates arising because of the fact that, the zero crossing of the capacitors 41, 41' occurring at the natural resonant frequency of the transformer and hence, any "uncertainty", that is to say any tendency to high-frequency noise that might cause a voltage reversal is inhibited by the presence of the capacitors 41, 41'. Because of the charging time determined by the resistors 31 and 32 and the capacitance of the capacitor 41 or by the resistors 31' and 32' and the capacitance of the capacitor 41', high-speed variations in the logic state are rendered impossible.

The closed state of the switch 20 is locked by positive feedback to the input A, which is grounded by the conducting diode 30 and the small drain-source voltage drop of the switch 20.

Incidentally, note that the voltage Vg at which switching occurs can be a null voltage or even slightly negative because of the conducting diode formed by the body of the MOSFET or by a diode added in parallel, conduction in the MOSFET being slightly delayed because of the need to charge its gate-source capacitance and its Miller capacitance.

After the switch 20' is opened, closing of the switch 20 is controlled automatically by the resistors 31, 32, the diode 30 and the NOR gate 40, the time Δt=t1−t0 for which closing of the switch 20 is inhibited depending only on the return to zero voltage across the transformer, irrespective of the factors determining this return to zero (electrical parameters, temperature, component parameter spread, etc). In other words the inhibit time t is a variable which is adjusted automatically to suit the response of the circuit.

On the next clock pulse rising edge (time t2) the same cycle is repeated, the roles of the components in the righthand and lefthand sides of the circuit being reversed, securing a "soft" commutation from switch 20 to switch 20'.

The purpose and operation of the start-up circuit 60 will now be described.

On starting up, or if the converter is momentarily stopped, the two drain voltages Vp and Vp' remain at the high level, producing a high level at the input of the gate 61. This results in a logic "0" at the gate output. If the switches remain non-conducting, the capacitors 41 and 41' discharge towards zero volts with a time constant set by the components 31, 32 and 41. When the first input of the gate 40 or 40' falls below the threshold a logic "1" is produced at Vg or Vg', the effect of which is to switch one of the switches, enabling normal starting of converter operation.

Because this circuit is still active, it detects the high state of the two drains at the switching transition (see the V61 waveform in the FIG. 2 timing diagram) and the capacitors charge with the same time constant as when they are used to reject high-frequency noise, as explained above (see the V41 and V41' waveforms in the FIG. 2 timing diagram).

The circuit shown in FIG. 1 is merely one of many possible implementations of the invention, the NOR gate being replacable by, for example, a digital or analog comparator or transistor or diode logic, to implement an appropriately inverted OR function securing the required inhibiting action, in other words ensuring that the winding voltage has fallen to the vicinity of zero volts before enabling the switch to be closed.

Figure 3:
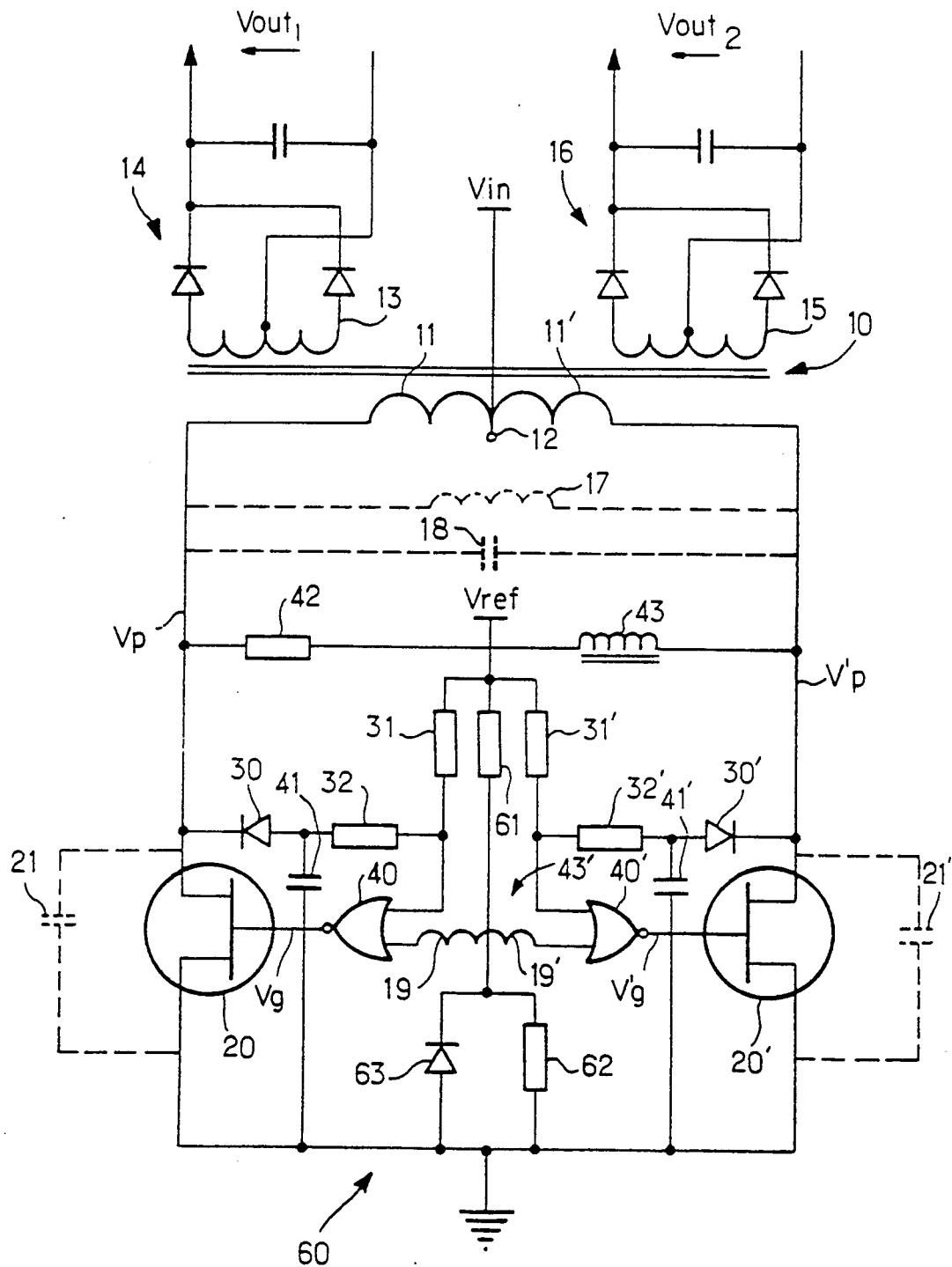
FIG. 3 shows a second embodiment of the invention.

FIG. 3 shows another embodiment of the invention in which the converter is not an externally controlled converter but a self-sustained oscillation converter.

In this figure the reference symbols refer to components or signals similar to those of FIG. 1. To simplify the description, they will not be described again here when their role is exactly the same.

The second embodiment of the circuit is distinguished from the previous embodiment by the fact that control, previously implemented by the signals Q and Q' derived from the external clock signal CK, is now provided by a feedback signal derived from the voltage produced by opposed auxiliary windings 19, 19' of the transformer 10 or of a miniature transformer 43 the primary of which is connected in series with a current limiter resistor 42 across the winding of the transformer 10.

These auxiliary windings cooperate with a circuit 60 including a divider bridge 61, 62 connected across the reference voltage Vref and the center point of which is connected to the common point of the windings 19, 19' so as to offset the signal produced by the latter by an appropriate DC voltage. A diode 63 selectively grounds the resistor 62 according to how it is biased.

The auxiliary windings 19, 19' control the inhibiting NOR gates 40, 40' directly to ensure that after one of the switches 20 or 20' is opened (whether such opening is automatic, due to saturation of the transformer 43 and therefore a drop in the voltages 19 and 19' according to the state of the converter, or forced by synchronization), closing of the opposite switch is inhibited until the voltage across the primary winding concerned has produced across the switch a sufficiently low voltage to ensure switching without losses.

Once this condition has been met, the logic authorizes transmission to the switch of the feedback signal produced by the corresponding auxiliary winding or by a separate transformer 43, so causing this switch to be closed.

It will be noted that in either embodiment the control logic is extremely simplified (one diode, two resistors and one gate), but provides entirely secure operation of the converter, irrespective of its specifications and operating conditions.

There is claimed:

1. Zero voltage switching DC/DC converter comprising a transformer with two opposed primary windings between which is a center tap and at least one secondary winding connected to a load by rectifier and capacitor filter means, a constant voltage supply of which a first terminal is connected to the center tap of the transformer, two switching means each connected in series between a second terminal of the voltage supply and a respective primary winding and means for controlling said switching means so as to connect the second terminal of the voltage supply alternately and periodically to one or the other of the primary windings, said controlling means imposing between opening of one switching means and subsequent closing of the other switching means a switching time during which both switching means are open, said converter further comprising means for automatically adjusting the switching time including detector means adapted to compare the voltage of each primary winding with a reference voltage and inhibiting means adapted to prevent, after opening of one switching means, closing of the other switching means until the voltage of the primary winding which corresponds to the latter switching means falls below a predetermined threshold.

2. Converter according to claim 1 in which said inhibiting means comprises, for each switching means, logic gate means of which one input receives from said controlling means a signal to close the switching means, the other input receives from the detector means a signal indicating that the voltage of the respective primary windings is not below said predetermined threshold and the output commands closing of the respective switching means.

3. Converter according to claim 2 wherein said logic gate means provides a switching means closing signal comprised of a control logic signal derived from an external clock signal.

4. Converter according to claim 2 wherein said logic means provides a switching means closing signal comprised of a feedback signal derived from the voltage provided by an auxiliary winding of a saturating transformer.

5. Converter according to claim 1 wherein said detector means comprises for each switching means a diode connected between the distal end of the respective primary winding and one terminal of a divider bridge, the other terminal of which is connected to a reference voltage supply, said inhibiting means being controlled by a signal at a center point of said divider bridge.

6. Converter according to claim 1 further comprising capacitors for inhibiting voltage reversals which could arise from the presence of high-frequency noise connected between the terminals of each respective switching means.

7. Converter according to claim 6 further comprising a start-up circuit including a gate responsive to detection of simultaneous opening of both switching means by causing said inhibiting capacitors to be discharged.

* * * * *